(12) United States Patent
Wong et al.

(10) Patent No.: US 7,831,641 B2
(45) Date of Patent: Nov. 9, 2010

(54) LARGE FILE SUPPORT FOR A NETWORK FILE SERVER

(75) Inventors: Thomas K. Wong, Pleasanton, CA (US); Panagiotis Tsirigotis, Sunnyvale, CA (US); Anand Iyengar, Mountain View, CA (US); Rajeev Chawla, Union City, CA (US)

(73) Assignee: Neopath Networks, Inc., Santa Clara, CA (US)

( * ) Notice: Subject to any disclaimer, the term of this patent is extended or adjusted under 35 U.S.C. 154(b) by 640 days.

(21) Appl. No.: 10/832,785

(22) Filed: Apr. 26, 2004

(65) Prior Publication Data

US 2004/0267831 A1   Dec. 30, 2004

Related U.S. Application Data

(60) Provisional application No. 60/478,154, filed on Apr. 24, 2003, provisional application No. 60/465,579, filed on Apr. 24, 2003, provisional application No. 60/465,578, filed on Apr. 24, 2003.

(51) Int. Cl.
   *G06F 17/30* (2006.01)

(52) U.S. Cl. .................. 707/822; 707/827; 707/828; 709/203; 709/219; 709/221

(58) Field of Classification Search .............. 707/205, 707/10, 100, 822, 827, 828; 709/201, 226, 709/203, 219, 221
   See application file for complete search history.

(56) References Cited

U.S. PATENT DOCUMENTS 5,689,701 A   11/1997 Ault et al.

(Continued)

FOREIGN PATENT DOCUMENTS

EP   0 926 585   6/1999

(Continued)

OTHER PUBLICATIONS

Leveraging the Benefits of the EMC CLARiiON IP4700 NFS with the Oracle8i Database, an Engineering White Paper, Mar. 5, 2002, EMC Corporation.

(Continued)

*Primary Examiner*—Don Wong
*Assistant Examiner*—Thanh-Ha Dang
(74) *Attorney, Agent, or Firm*—Weaver Austin Villeneuve and Sampson LLP (57) ABSTRACT

A NAS switch provides large file support to a file server in a decentralized storage network such as a NAS (Network Attached Storage) storage network. For example, files greater than 2-GB can be stored on a 32-bit commodity file server. The NAS switch sits in the data path of a client on the front end and a commodity NAS file server on the back end. A segmentation module in the NAS switch stores large files as separate data chunks in the file server. To do so, the segmentation module stores a directory file handle, which points to a directory containing the data chunks, in place of the large file. The segmentation module can also store a large file/chunk directory association in a migration cache. A reconstruction module processes client requests concerning large files by issuing requests to specific data chunks. For example, in a read operation, the reconstruction module calculates chunk numbers to determine which file to read and offsets to determine which byte to read within a chunk.

25 Claims, 6 Drawing Sheets

U.S. PATENT DOCUMENTS

| | | | |
|---|---|---|---|
| 5,774,715 | A | 6/1998 | Madany et al. |
| 5,890,169 | A * | 3/1999 | Wong et al. ............... 707/206 |
| 5,933,825 | A | 8/1999 | McClaughry et al. |
| 6,101,508 | A * | 8/2000 | Wolff ........................ 709/223 |
| 6,192,408 | B1 | 2/2001 | Vahalia et al. |
| 6,314,460 | B1 | 11/2001 | Knight et al. |
| 6,353,837 | B1 | 3/2002 | Blumenau |
| 6,389,427 | B1 * | 5/2002 | Faulkner ................. 707/104.1 |
| 6,408,298 | B1 | 6/2002 | Van et al. |
| 6,442,548 | B1 | 8/2002 | Balabine et al. |
| 6,453,354 | B1 | 9/2002 | Jiang et al. |
| 6,473,401 | B1 | 10/2002 | Kong et al. |
| 6,606,690 | B2 * | 8/2003 | Padovano ................... 711/148 |
| 6,615,365 | B1 * | 9/2003 | Jenevein et al. ............. 714/6 |
| 6,633,887 | B2 * | 10/2003 | Suzuki et al. ............. 707/102 |
| 6,697,846 | B1 | 2/2004 | Soltis |
| 6,711,625 | B1 * | 3/2004 | Simpson ..................... 710/5 |
| 6,738,883 | B2 * | 5/2004 | March et al. ............. 711/171 |
| 6,931,410 | B2 | 8/2005 | Anderson et al. |
| 6,938,039 | B1 | 8/2005 | Bober et al. |
| 6,983,379 | B1 | 1/2006 | Spalink et al. |
| 6,985,956 | B2 | 1/2006 | Luke et al. |
| 6,996,714 | B1 | 2/2006 | Halasz et al. |
| 7,054,927 | B2 * | 5/2006 | Ulrich et al. ............... 709/223 |
| 7,072,917 | B2 | 7/2006 | Wong et al. |
| 7,089,293 | B2 * | 8/2006 | Grosner et al. ............. 709/217 |
| 7,096,253 | B2 * | 8/2006 | Vinson et al. ............... 709/203 |
| 7,120,666 | B2 * | 10/2006 | McCanne et al. ........... 709/203 |
| 7,127,477 | B2 * | 10/2006 | Duncombe et al. ......... 707/203 |
| 7,272,613 | B2 * | 9/2007 | Sim et al. ................... 707/102 |
| 7,272,654 | B1 | 9/2007 | Brendel |
| 7,308,709 | B1 | 12/2007 | Brezak et al. |
| 7,313,579 | B2 * | 12/2007 | Murotani ................... 707/204 |
| 7,346,664 | B2 | 3/2008 | Wong et al. |
| 7,441,011 | B2 | 10/2008 | Lin et al. |
| 7,475,142 | B2 | 1/2009 | Sharma et al. |
| 7,512,673 | B2 * | 3/2009 | Miloushev et al. .......... 709/221 |
| 7,587,422 | B2 | 9/2009 | Wong et al. |
| 7,720,796 | B2 | 5/2010 | Wong et al. |
| 2002/0013832 | A1 | 1/2002 | Hubbard |
| 2002/0111929 | A1 | 8/2002 | Pudipeddi et al. |
| 2002/0120763 | A1 * | 8/2002 | Miloushev et al. .......... 709/230 |
| 2002/0133491 | A1 * | 9/2002 | Sim et al. ..................... 707/10 |
| 2002/0154645 | A1 * | 10/2002 | Hu et al. ..................... 370/401 |
| 2002/0161855 | A1 | 10/2002 | Manczak et al. |
| 2002/0199060 | A1 * | 12/2002 | Peters et al. ................. 711/114 |
| 2003/0037061 | A1 | 2/2003 | Sastri et al. |
| 2003/0046270 | A1 | 3/2003 | Leung et al. |
| 2003/0046335 | A1 * | 3/2003 | Doyle et al. ................. 709/203 |
| 2003/0056112 | A1 * | 3/2003 | Vinson et al. ............... 713/200 |
| 2003/0110263 | A1 * | 6/2003 | Shillo ........................ 709/226 |
| 2003/0126247 | A1 * | 7/2003 | Strasser et al. .............. 709/223 |
| 2003/0140051 | A1 * | 7/2003 | Fujiwara et al. ............. 707/100 |
| 2003/0154236 | A1 | 8/2003 | Dar et al. |
| 2003/0177178 | A1 * | 9/2003 | Jones et al. .................. 709/203 |
| 2003/0182313 | A1 * | 9/2003 | Federwisch et al. ......... 707/200 |
| 2003/0195903 | A1 * | 10/2003 | Manley et al. .............. 707/201 |
| 2003/0204613 | A1 * | 10/2003 | Hudson et al. .............. 709/231 |
| 2003/0204670 | A1 | 10/2003 | Holt et al. |
| 2003/0220985 | A1 * | 11/2003 | Kawamoto et al. .......... 709/219 |
| 2004/0010714 | A1 | 1/2004 | Stewart |
| 2004/0024963 | A1 | 2/2004 | Talagala et al. |
| 2004/0054748 | A1 * | 3/2004 | Ackaouy et al. ............. 709/214 |
| 2004/0078465 | A1 * | 4/2004 | Coates et al. ................ 709/226 |
| 2004/0088297 | A1 * | 5/2004 | Coates et al. ................ 707/10 |
| 2004/0103104 | A1 * | 5/2004 | Hara et al. ................... 707/100 |
| 2004/0117438 | A1 * | 6/2004 | Considine et al. ........... 709/203 |
| 2004/0133577 | A1 | 7/2004 | Miloushev et al. |
| 2004/0133606 | A1 | 7/2004 | Miloushev et al. |
| 2004/0133650 | A1 | 7/2004 | Miloushev et al. |
| 2004/0133652 | A1 * | 7/2004 | Miloushev et al. .......... 709/214 |
| 2004/0139167 | A1 * | 7/2004 | Edsall et al. ................. 709/212 |
| 2004/0153481 | A1 * | 8/2004 | Talluri ........................ 707/200 |
| 2004/0267752 | A1 | 12/2004 | Wong et al. |
| 2004/0267831 | A1 | 12/2004 | Wong et al. |
| 2005/0033932 | A1 * | 2/2005 | Pudipeddi et al. ........... 711/162 |
| 2005/0055402 | A1 * | 3/2005 | Sato ........................... 709/205 |
| 2005/0125503 | A1 | 6/2005 | Iyengar |
| 2005/0188211 | A1 | 8/2005 | Scott et al. |
| 2005/0198062 | A1 | 9/2005 | Shapiro |
| 2005/0262102 | A1 | 11/2005 | Anderson et al. |
| 2006/0080371 | A1 | 4/2006 | Wong et al. |
| 2006/0161746 | A1 | 7/2006 | Wong et al. |
| 2006/0271598 | A1 | 11/2006 | Wong et al. |
| 2007/0024919 | A1 | 2/2007 | Wong et al. |
| 2007/0136308 | A1 | 6/2007 | Tsirigotis et al. |
| 2008/0114854 | A1 | 5/2008 | Wong et al. |

FOREIGN PATENT DOCUMENTS

| | | |
|---|---|---|
| EP | 1 209 556 | 5/2002 |
| JP | 2005/502096 | 1/2005 |
| WO | 2004/097571 | 4/2004 |
| WO | 2004/097686 | 4/2004 |
| WO | WO2004/053677 | 6/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | 2006/080371 | 8/2006 |
| WO | 2007/002855 | 1/2007 |
| WO | 2007/041456 | 4/2007 |

OTHER PUBLICATIONS

Anderson et al., Interposed Request for Scalable Network Storage, ACM transactions on Computer Systems, vol. 20, No. 1, Feb. 2002.
U.S. Appl. No. 60/465,578, filed Apr. 24, 2003.
U.S. Appl. No. 60/465,579, filed Apr. 24, 2003.
U.S. Appl. No. 60/615,002, filed Sep. 30, 2004.
U.S. Appl. No. 60/641,217, filed Dec. 31, 2004.
U.S. Appl. No. 60/465,580, filed Apr. 24, 2003.
U.S. Appl. No. 60/503,190, filed Sep. 15, 2003.
Bright et al. A scalable Architecture for Clustered Network Attached Storage, IEEE/NASA MMSTApr. 7-10, 2003.
Jonathan Goldick, Retry of extending networking design notes, PSC, Carnegie-Mellon Univeristy, Feb. 1995.
Office Action mailed Dec. 18, 2006 for U.S. Appl. No. 10/831,701.
Final Office Action mailed Sep. 12, 2007, for U.S. Appl. No. 10/831,701.
Office Action, U.S. Appl. No. 10/831,701, mailed Jun. 25, 2008.
Final Office Action, U.S. Appl. No. 10/831,701, mailed Jan. 5, 2009.
Notice of Allowance, U.S. Appl. No. 10/831,701, mailed May 14, 2009.
Allowed Claims, U.S. Appl. No. 10/831,701.
Office Action mailed Jan. 11, 2008, for U.S. Appl. No. 11/324,845.
Final Office Action, U.S. Appl. No. 11/324,845, mailed Sep. 5, 2008.
Office Action mailed Feb. 9, 2009, for U.S. Appl. No. 11/324,845.
Office Action mailed Mar. 23, 2007, for U.S. Appl. No. 10/831,376.
Final Office Action mailed Aug. 10, 2007, for U.S. Appl. No. 10/831,376.
Notice of Allowance mailed Oct. 22, 2007, for U.S. Appl. No. 10/831,376.
Allowed Claims, U.S. Appl. No. 10/831,376.
Office Action, U.S. Appl. No. 11/241,554, mailed Aug. 8, 2007.
Final Office Action, U.S. Appl. No. 11/241,554, mailed Jul. 25, 2008.
Office Action, U.S. Appl. No. 11/241,554, mailed Jan. 8, 2009.
Final Office Action, U.S. Appl. No. 11/241,554, mailed Aug. 19, 2009.
Office Action, U.S. Appl. No. 11/395,118, mailed Jun. 10, 2009.
Office Action mailed Feb. 3, 2005 for U.S. Appl. No. 10/832,927.
Office Action mailed Jun. 22, 2005 for U.S. Appl. No. 10/832,927.
Notice of Allowance mailed Feb. 9, 2006 for U.S. Appl. No. 10/832,927.
Allowed Claims, U.S. Appl. No. 10/832,927.

Non-Final Office Action dated Jan. 8, 2009 for U.S. Appl. No. 10/942,762.
Final Office Action dated Jul. 21, 2009 for U.S. Appl. No. 10/942,762.
PCT Int'l Search Report and Written Opinion PCT/US04/12841, dated Oct. 13, 2004.
PCT Search Report and Written Opinion PCT/US04/12846, dated Sep. 28, 2004.
PCT Search Report and Written Opinion PCT/US04/12847 dated Nov. 3, 2004.
International Preliminary Report on Patentability dated Apr. 10, 2008 for PCT Application No. PCT/US2006/038361.
PCT Int'l Search Report and Written Opinion PCT/US04/12844, Mar. 14, 2005, 14 pages.
PCT Int'l Search Report and Written Opinion PCT/US04/30180 dated Mar. 27, 2006.
International Search Report sent Sep. 30, 2008 for PCT Application No. PCT/US05/35624.
Written Opinion sent Sep. 30, 2008 for PCT Application No. PCT/US05/35624.
International Search Report mailed May 8, 2007 for PCT Application No. US/2006/25430.
Written Opinion mailed May 8, 2007 for PCT Application No. US/2006/25430.
European Search Report dated Dec. 14, 2008 for EP Patent Application No. 04750678.7.
European Office Action dated Apr. 9, 2009 for EP Patent Application No. 04750678.7.
Yamakawa et al., "NAS Switch: Virtualized Integration Techniques of NFS Server", Engineering Research Report of Institute of Electronics, Information and Communication Engineers published by Institute of Electronics, Information and Communication Engineers, Japan, Aug. 12, 2002, vol. 102, No. 275, pp. 13-18. Japan, Considered English Abstract Only.
Notice of Allowance mailed Sep. 21, 2009, for U.S. Appl. No. 11/324,845.
Notice of Allowance mailed Dec. 2, 2009, for U.S. Appl. No. 11/324,845.
Notice of Allowance mailed Mar. 16, 2010, for U.S. Appl. No. 11/324,845.
Examiner Interview, U.S. Appl. No. 11/241,554, mailed Sep. 30, 2009.
Office Action, U.S. Appl. No. 11/241,554, mailed Feb. 5, 2010.
Final Office Action, U.S. Appl. No. 11/395,118, mailed Feb. 18, 2010.
Office Action, U.S. Appl. No. 11/537,997, mailed Sep. 25, 2009.
Non-Final Office Action dated Jan. 15, 2010 for U.S. Appl. No. 10/942,762.
European Office Action dated Feb. 22, 2010 for EP Patent Application No. 04750678.7.
Chinese Office Action dated Nov. 20, 2009 for CN Patent Application No. 200680032142.X.
Japanese Office Action dated Dec. 22, 2009 for JP Patent Application No. 2006-513342.
U.S. Appl. No. 60/478,154, filed Apr. 24, 2003, Wong et al.
U.S. Appl. No. 60/667,567, filed Mar. 31, 2005, Wong et al.
U.S. Appl. No. 60/722,465, filed Sep. 30, 2005, Tsirigotis et al.
Yamakawa et al., (Aug. 12, 2002) "NAS Switch: Virtualized Integration Techniques of NFS Server", Engineering Research Report of Institute of Electronics, Information and Communication Engineers published by Institute Electronics, Information and Communication Engineers, Japan, 102(275):13-18.
US Advisory Action dated Nov. 27, 2007 issued in U.S. Appl. No. 10/831,701.
US Advisory Action dated Nov. 21, 2008 issued in U.S. Appl. No. 11/324,845.
US Examiner Interview Summary Application dated Mar. 31, 2009 issued in U.S. Appl. No. 11/241,55.
US Office Action dated Apr. 15, 2010 issued in U.S. Appl. No. 11/537,997.
PCT International Search Report dated Aug. 29, 2007 issued in PCT/US2006/038361.
PCT International Preliminary Report on Patentability and Written Opinion dated Aug. 29, 2007 issued in PCT/US2006/038361.
PCT International Search Report dated May 9, 2008 issued in PCT/US05/35624.
PCT International Preliminary Report on Patentability and Written Opinion dated May 9, 2008 issued in PCT/US05/35624.
PCT International Search Report dated May 8, 2007 issued in US/2006/25430 PCT/US2006/25430.
PCT Written Opinion dated May 8, 2007 issued in US/2006/25430 PCT/US2006/25430.
US Office Action Final dated Jul. 21, 2010 issued in U.S. Appl. No. 11/241,554.
US Office Action (Examiner Interview Summary) dated Jul. 19, 2010 issued in U.S. Appl. No. 11/537,997.
European Supplementary Search Report dated Jun. 4, 2010 issued in EP 06 81 5981.

* cited by examiner

LARGE FILE SUPPORT FOR A NETWORK FILE SERVER

CROSS-REFERENCE TO RELATED APPLICATIONS

This application claims priority under 35 U.S.C. §119(e) to: U.S. Provisional Patent Application No. 60/478,154, filed on Apr. 24, 2003, entitled "Method and Apparatus to Provide Large File Support to a Network File Server," by Thomas K. Wong et al.; U.S. Provisional Patent Application No. 60/465, 579, filed on Apr. 24, 2003, entitled "Method and Apparatus for Transparent File Migration Using the Technique of Namespace Replication," by Thomas K. Wong et al.; U.S. Provisional Patent Application No. 60/465,578, filed on Apr. 24, 2003, entitled "Method and Apparatus for Transparent File Replication Using the Technique of Namespace Replication," by Thomas K. Wong et al.; and is related to U.S. patent application Ser. No. 10/831,376, filed on Apr. 23, 2004, entitled "Transparent File Migration Using Namespace Replication," by Thomas K. Wong et al.; and U.S. patent application Ser. No. 10/831,701, filed on Apr. 23, 2004, entitled "Transparent File Replication Using Namespace Replication," by Thomas K. Wong et al., each of which applications are herein incorporated by reference in their entirety.

BACKGROUND OF THE INVENTION

1. Field of the Invention

This invention relates generally to storage networks and, more specifically, to a network device on a storage network that coordinates segmentation and reconstruction of a file having a size larger than a native processing capability of a commodity file server into several data chunks within its capability.

2. Description of the Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access the same files on a NAS file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between clients and file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

Another drawback of NAS file servers is that as commodity devices, they are typically outfitted with 32-bit legacy software and/or hardware that is not capable of processing files greater than 2-GB. For example 32-bit processors and NFS version 2 NAS protocol are limited to 32-bit data capability. Problematically, many data files are larger than 2-GB such as video files and back-up files. Other files start out less than 2-GB, but subsequently grow beyond this size. Additionally, heterogeneous NAS storage networks can contain both enterprise file servers that support 64-bit data and commodity file servers that support 32-bit data that cannot be used to replicate or migrate large data files between each other.

Therefore, what is needed is a robust network device to provide transparency for clients of decentralized file servers such as NAS file servers. Furthermore, the network device should transparently coordinate large file storage on a commodity file server and process access request to the large file.

BRIEF SUMMARY OF THE INVENTION

The present invention meets these needs by provides large file support to a file server in a decentralized storage network. A NAS (Network Attached Storage) switch in the data path of a client and a NAS file server on the storage network, coordinates storage and reconstruction of files larger than the NAS file server can natively process as several data chunks of a size that the NAS file server can process. Advantageously, the client transparently stores large files, such as files greater than 2-GB, on the NAS file server, such as a NAS file server that is natively limited to processing 32-bit data.

An embodiment of a system configured according to the present invention comprises the NAS switch in communication with the client on a front-end of the storage network, and both an enterprise file server and a commodity file server on a back-end. The NAS switch associates NAS file handles (e.g., CIFS file handles or NFS file handles), indicative of an object location on the storage network, with switch file handles that are independent of the object location. The NAS switch then exports the switch file handles to the client. In response to subsequent object access requests from the client, the NAS switch substitutes switch file handles with appropriate NAS file handles for submission to the appropriate NAS file server location.

A segmentation module in the NAS switch stores large files as separate data chunks in the commodity file server. To do so, the segmentation module stores a directory file handle, which points to a directory containing the data chunks, in place of the large file. The segmentation module determines data chunk names by performing calculations that use a file offset and a data chunk size. In one embodiment, the segmentation module stores the directory file handle in a large file handle table that correlates directory file handles for large files with switch file handles. The segmentation module can also store the directory file handle in a file handle migration table that correlates directory file handles and migrated file handles with switch file handles.

A reconstruction module processes client request concerning large files by issuing requests to specific data chunks. The reconstruction module performs calculations to determine which data chunk to process. For example, in a read operation, the reconstruction module calculates a chunk number by dividing a file offset by a present data chunk size.

DETAILED DESCRIPTIONS OF THE INVENTION

The present invention provides large file support to a file server in a decentralized storage network. A NAS switch in the data path of a client and a NAS file server on the storage network, coordinates storage of files larger than the NAS file server can natively process as several data chunks of a size that the NAS file server can process. Some embodiments of a system are described with respect to FIGS. 1-2, and some embodiments of a method operating therein are described with respect to FIGS. 3-6.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

Figure 1:
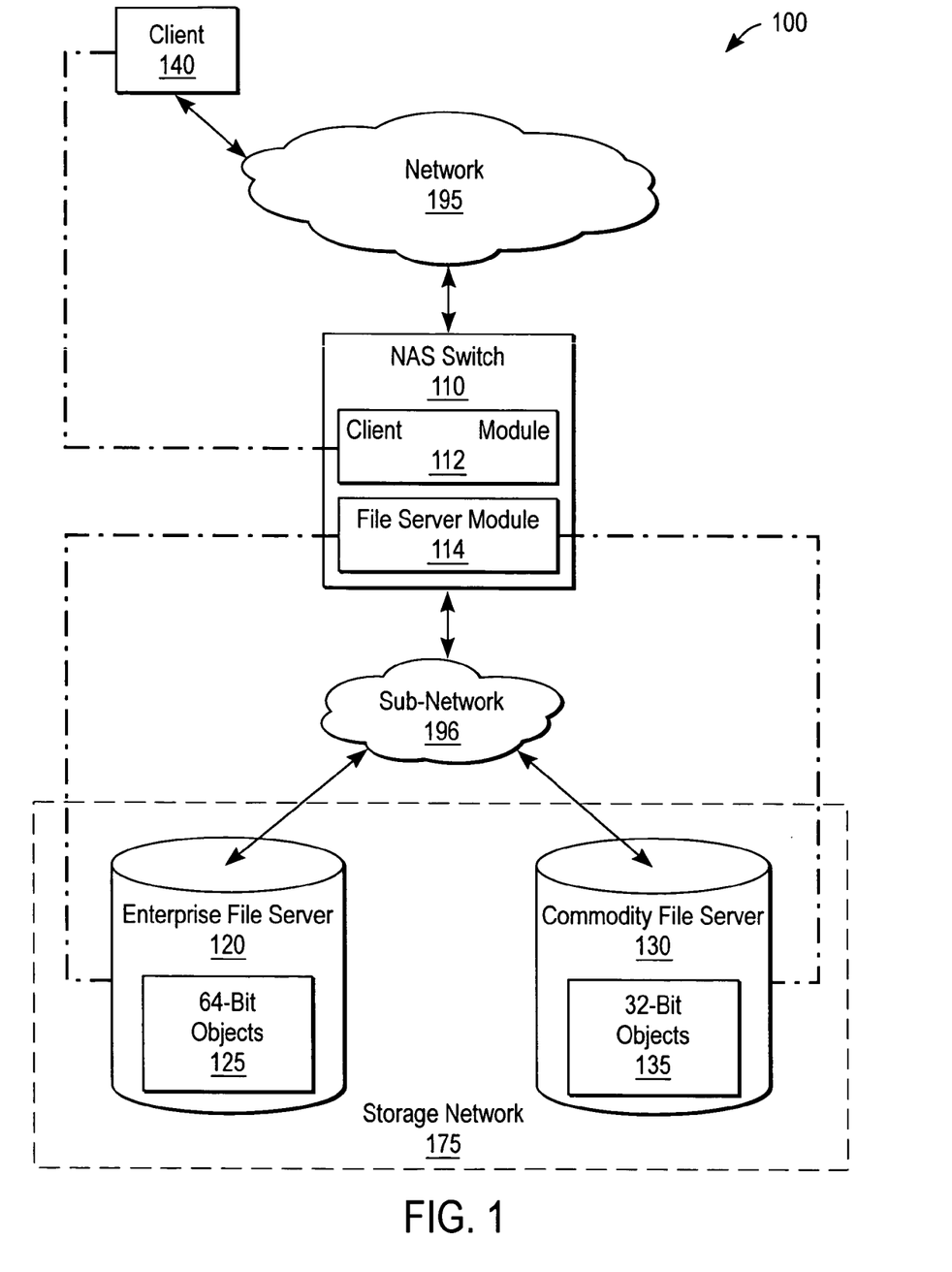
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 and a client 140 coupled to a network 195. The NAS switch 110, an enterprise file server 120, and a commodity file server 130, are each coupled in communication through a sub-network 196. Note that there can be various configurations of the system 100, such as embodiments including additional clients 140, additional enterprise and/or commodity file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, and the like. In one embodiment, the storage network 175 comprises a NAS using protocols such as NFS (Network File System) and CIFS (Common Internet File System). In another embodiment, the storage network 175 comprises a combination of NAS, SAN (Storage Area Network), and other types of storage networks. In yet another embodiment the storage network 175 comprises a decentralized standard or proprietary storage system other than NAS.

The NAS switch 110 provides continuous transparency to the client 140 with respect to object management. Specifically, the NAS switch 110 can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for a large file object on the commodity file server 130 to an appropriate directory on the commodity file server 130 containing data chunks. Thus, the client 140 submits object requests, such as file writes and directory reads, directly to the NAS switch 110. Likewise, the file servers 120, 130 are unaware of the NAS switch 110 since the NAS switch 110 is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 comprises a client module 112 and a file server module 114 to facilitate communications and file handle switching. The client module 112 receives exported file system directories from the file servers 120, 130 containing NAS switch handles. To create compatibility between the client 140 and the NAS switch 110, the client module 112 maps the file system directories to internal switch file systems which it sends to the client 140. To request an object, the client 140 traverses an exported switch file system and selects a switch file handle which it sends to the NAS switch 110 along with a requested operation.

The file server module 114 coordinates segmentation of large files. The file server module 114 initiates tasks that are passively performed by the commodity file server 130. The file server module 114 segments large files into smaller data chunks and organizes their storage such that the large files can later be retrieved from just the switch file handle received from the client 140. In one embodiment, the file server module 114 migrates and/or replicates 64-bit objects 125 on the enterprise file server 120 to 32-bit objects 135 on the commodity file server 130. During retrieval, the file server module 114 redirects a large file request by the client 140 into several requests to individual data chunks on the commodity file server 130. Thus, large files remain transparently available to the client 140 even when the commodity file server 130 does not natively support software and/or hardware data processing above 32-bits.

In one embodiment, the file server module 114 also tracks reconfigurations resulting from migration, replication and other processes (e.g. adding or removing file server capacity) with a nested system of tables, or information otherwise linked to the switch file systems. The switch file handles are static as they are persistent through replications, but the associated NAS file handles can be dynamic as they are selected depending upon which particular copy is being accessed. To track various copies of an object, the file server module 114 maintains a file handle replication table, corresponding to each file system, that maps NAS file handles of replicated objects to locations on the storage network 175 and to status information about the replication locations. Further embodiments of the file server module 114 are described with respect to FIG. 2.

In general, NAS file handles uniquely identify objects on the file servers 120, 130, such as a directory or file, as long as that object exists. NAS file handles are file server specific, and are valid only to the file servers 120, 130 that issued the file handles. The process of obtaining a NAS file handle from a file name is called a look-up. A NAS file handle, which identifies a directory or file object by location, may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the commodity file server 130. A stored file handle is stored in place of a migrated or to be replicated object as a pointer to an alternate location.

Object access requests handled by the NAS switch 110 include, for example, directory and/or file reads, writes, creation, deletion, moving, and copying. As used herein, various terms are used synonymously to refer to a location of an object prior to replication (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the file servers 120, 130 by using a switch file handle submitted to the NAS switch 110. To access an object, the client 140 first mounts an exported file system preferably containing switch file handles. The client 140 looks-up an object to obtain its file handle and submits an associated request. From the perspective of the client 140, transactions are carried out by a file server 120, 130 having object locations that do not change. Thus, the client 140 interacts with the NAS switch 110 before and after a large file segmentation in the same manner. A user of the client 140 can submit operations through a command line interface, a windows environment, a software application, or otherwise. In one embodiment, the client 140 provides access to a storage network 175 other than a NAS storage network.

The enterprise file server 120 further comprises 64-bit objects 125 including data such as enterprise data, records, database information, applications, and the like. The enterprise file server 120 comprises the software and hardware resources necessary for 64-bit data support to files greater than 2-GB. For example, the enterprise file server 120 can comprise a 64-bit processor and a NAS file server version suitable for 64-bit support. In one embodiment, the NAS switch 110 stores large files in smaller data chunks to improve data manageability even though the large files are within the processing capability of the enterprise file server.

The commodity file server 130 further comprises 32-bit objects 135 including 32-bit data. The commodity file server 130 is limited to native 32-bit data support by one or more software or hardware resources such as a 32-bit processor or NFS version 2. Both the enterprise and commodity file servers 120, 130 also preferably comprise a file system compatible with NAS protocols. In one embodiment, the file servers 120, 130 comprise a decentralized file servers, or file servers that otherwise do not natively support coordinated services.

The network 195 facilitates data transfers between connected hosts (e.g., 110, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The sub-network 196 is preferably a local area network providing optimal response time to the NAS switch 110. In one embodiment, the sub-network 196 is integrated into the network 195.

Figure 2:
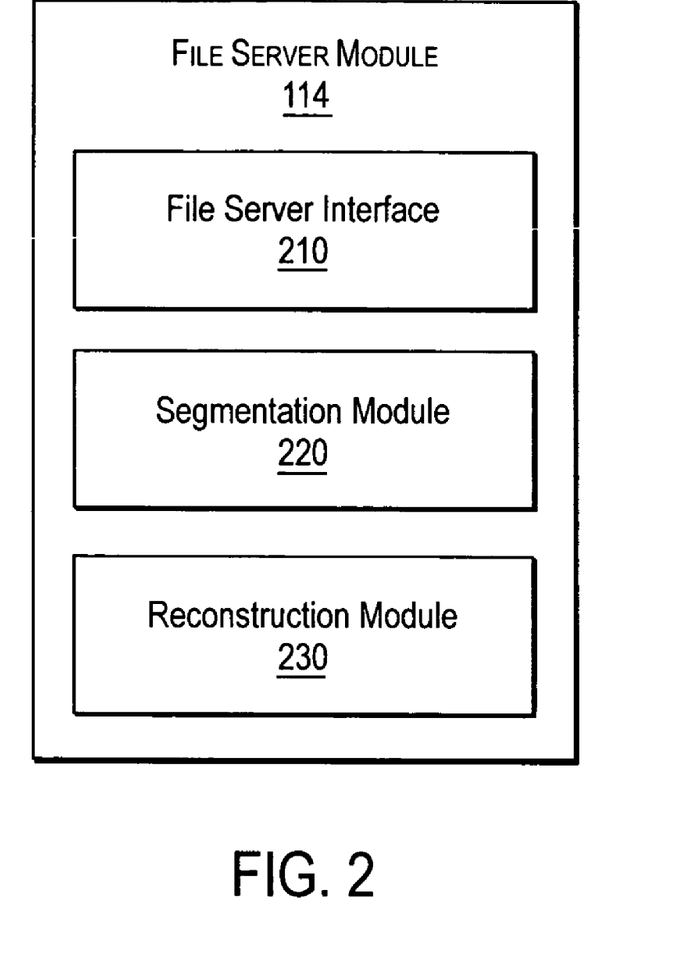
FIG. 2 is a block diagram illustrating a file server module according to one embodiment of the present invention.

FIG. 2 is a block diagram illustrating the file server module 114 according to one embodiment of the present invention. The file server module 114 comprises a file server interface 210, a segmentation module 220, and a reconstruction module 230. Generally, the file server interface 210 manages client requests using the segmentation module 220 for inputting large file objects to the storage network 175, and using the reconstruction module 230 for outputting reconstructed objects to the client 140. Note that rather than being strict structural separations, "modules" are merely exemplary groupings of functionality corresponding to one or many structures.

The file server interface 210 receives a switch file handle with a request from the client 140 which it uses to form a NAS file handle with a request to the commodity file server 130. If the request involves a large file, the file server interface 210 receives a directory file handle and one or more data chunk file handles from the segmentation module 220. If the request does not involve a large file handle, the file server interface 210 can use an original NAS file handle to access the data.

The segmentation module 220 receives an input request from the file server interface 210 from which it can form requests to the directory containing related data chunks. The segmentation module 220 separates large files into several data chunks. The segregation module 220 tracks a current file offset and uses a preset data chunk size to coordinate between the incoming large file and outgoing data chunks. For example, by dividing the file offset by the preset data chunk size yields a current data chunk, the segmentation module 220 calculates a next data chunk to create. The segmentation module 220 updates, for example, a data chunk number, a file offset, and the like, while segmenting the large file. Additionally, the segregation module 220 stores file handles based on an emulated storage location of the large file and a storage location of the directory in the commodity file server 130 containing the data chunks. In one embodiment, these file handles are stored in an entry of a file handle migration table that also stores migrated file handles. Thus, the large file service can be easily integrated into the NAS switch 110 if it already supports file migration services. In another embodiment, these file handles are stored in an entry of a dedicated large file table.

In one embodiment, the segmentation module 220 also assists the file server module 114 in migrating or replicating 64-bit objects 125 on the enterprise file server 120 to 32-bit objects 135 on the commodity file server 130. In file migration, the file server module 210 maintains a file handle migration table in which it correlates source (or original) NAS file handles on the enterprise file server 120 with destination (or new) file locations on the commodity file server 130. The segregation module 220 breaks up the large file into data chunks stored in a directory. Thus, the destination file handle refers to the directory containing related data chunks. In file replication, the file server module 210 maintains a file handle replication table in which it correlates primary (or original) file handles on the enterprise file server 120 with replica (or new) file handles on the commodity file server 130. Thus, the replica file handle refers to the directory containing related data chunks. Given the above disclosure, note that the segregation module 220 can assist additional services of the NAS switch 110.

The reconstruction module 230 receives an output request from the client 140 from the file server interface 112 from which it forms one or more output requests for data chunks on the commodity file server 130. Example requests include read, write, truncate, and the like. In one embodiment, the reconstruction module 230 can recognize large file accesses by looking-up the switch file handle received from the client 140 to perform a look-up in the large file table for an associated directory file handle. In another embodiment, the reconstruction module 230 looks-up the switch file handle in the file migration table for a destination file handle. If there is a hit in the file handle migration table, the reconstruction module 230 next checks the size of an object referred to by the destination file handle. If the object matches a size of a stored directory file handle, the switch file handle very likely corresponds to a large file. The reconstruction module 230 can take additional steps to verify that the directory file handle points to a large file directory by confirming that the directory contains data chunks.

Before forming requests to the commodity file server 130, the reconstruction module 230 determines which data chunk to access. In one embodiment, the reconstruction module 230 uses the same or reverse calculations used by the segmentation module 220 so that given the same inputs (e.g., file name, file offset, preset data chunk size), the reconstruction module can calculate which data chunk to access. For example, the reconstruction module 230 finds a data chunk to read or write to by dividing a file offset by a preset data chunk size. The reconstruction module 230 updates, for example, a data chunk number, a file offset, a number of bytes read, a number of bytes remaining, and the like, while processing a large file request. Additional embodiments of the file server module 114 and methods operating therein are described below.

Figure 3:
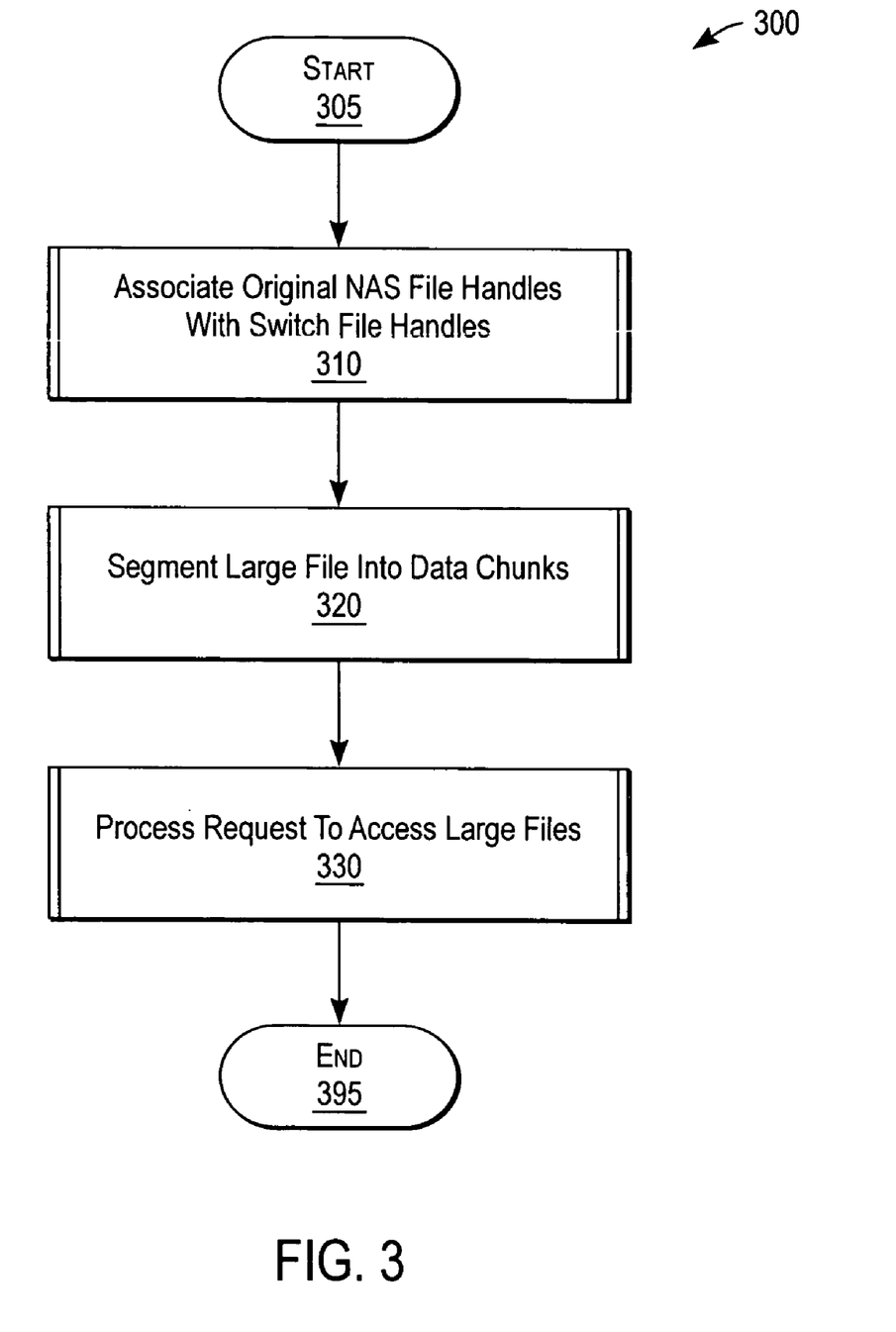
FIG. 3 is a high-level flow chart illustrating a method of coordinating large file storage according to one embodiment of the present invention.

FIG. 3 is a high-level flow chart illustrating a method 300 of coordinating large file storage according to one embodiment of the present invention. The client module 112 associates 310 an original NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were the file server 120, 130, and, in turn, the file servers 120, 130 process NAS file handles from the NAS switch 110 as if they were submitted by the client 140.

The segmentation module 220 segments 320 large files into data chunks as described below with respect to FIG. 5. By separating the large file into several data chunks, the NAS switch 110 provides support for file sizes larger than the commodity file server 130 is natively capable of processing.

The reconstruction module 230 processes 330 requests to access large files as described below with respect to FIG. 6. Because the NAS switch 110 coordinates large file storage, the client 140 continues referring to the large file even though the large file is actually stored as one or more separate data chunks.

Figure 4:
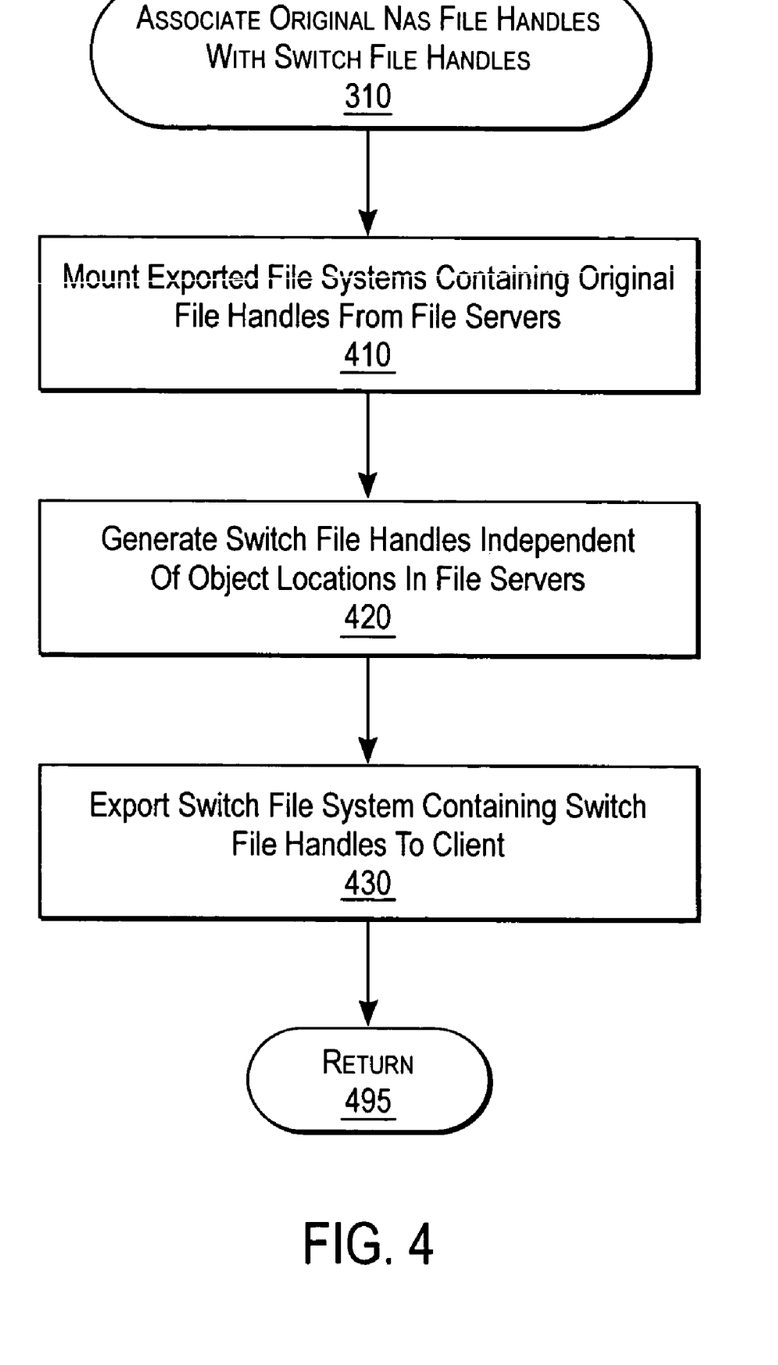
FIG. 4 is a flow chart illustrating a method of associating original NAS file handles with switch file handles according to one embodiment of the present invention.

FIG. 4 is a flow chart illustration the method 310 of associating an original NAS file handle with a switch file handle according to one embodiment of the present invention. Initially, the NAS switch 140 mounts 410 an exported directory of file systems from the commodity server 130. In general, the file system organizes objects on a file server 120, 130 into a directory hierarchy of NAS file handles. In one embodiment, the NAS switch 110 receives exported directories from the commodity file server 130 and, in turn, sends exported directories to the client 140.

The client module 112 generates 420 switch file handles independent of object locations in the commodity file server 130. The client module 112 organizes exported file systems from the file server 130 by replacing file system or tree identifiers with a switch file system number as shown below in Tables 2A and 2B. The client module 112 exports 430 the switch file system to the client 140 to use in requesting operations. In the reverse process, the NAS switch 110 receives the NAS request and looks-up the switch file handle to obtain an appropriate NAS file handle. Accordingly, the reconstruction module 230 returns a directory file handle if the switch file handle refers to a large file. The file server interface 210 generates a NAS file handle from the switch file handle based on an object location. An example of the contents of an NFS and CIFS file handle are shown in Tables 1A and 1B, while an example of switch file handles or modified NFS and CIFS file handles are shown in Tables 2A and 2B:

TABLE 1A

NFS File Handle Contents

| Field Name | Description |
| --- | --- |
| fsid | File system identification - identifies an exported file system of a file server |
| file id | File identification - identifies a file or directory object of an exported file system |
| gen id | Generation identification - changes each time the file identification is re-used to identify a different file or directory object |

TABLE 1B

CIFS File Handle Contents

| Field Name | Description |
| --- | --- |
| tree id | Tree identification - assigned by a CIFS server |
| file id | File identification - unique within a tree identification |

TABLE 2A

Contents of NFS Switch File Handle

| Field Name | Description |
| --- | --- |
| file system id | File system identification - index to NAS switch 110 file system export table that identifies the name and location of a NAS file server |
| file id | File identification - identifies a file or directory object of an exported file system |
| gen id | Generation identification - changes each time the file identification is re-used to identify a different file or directory object |

TABLE 2B

Contents of CIFS Switch File Handle

| Field Name | Description |
| --- | --- |
| file system id | File system identification - index to NAS switch 110 file system export table that identifies the name and location of a NAS file server |
| file id | File identification - unique within a tree identification |

As discussed below, after objects have been segmented, the NAS switch 110 can access objects at new locations using updated NAS file handle.

Figure 5:
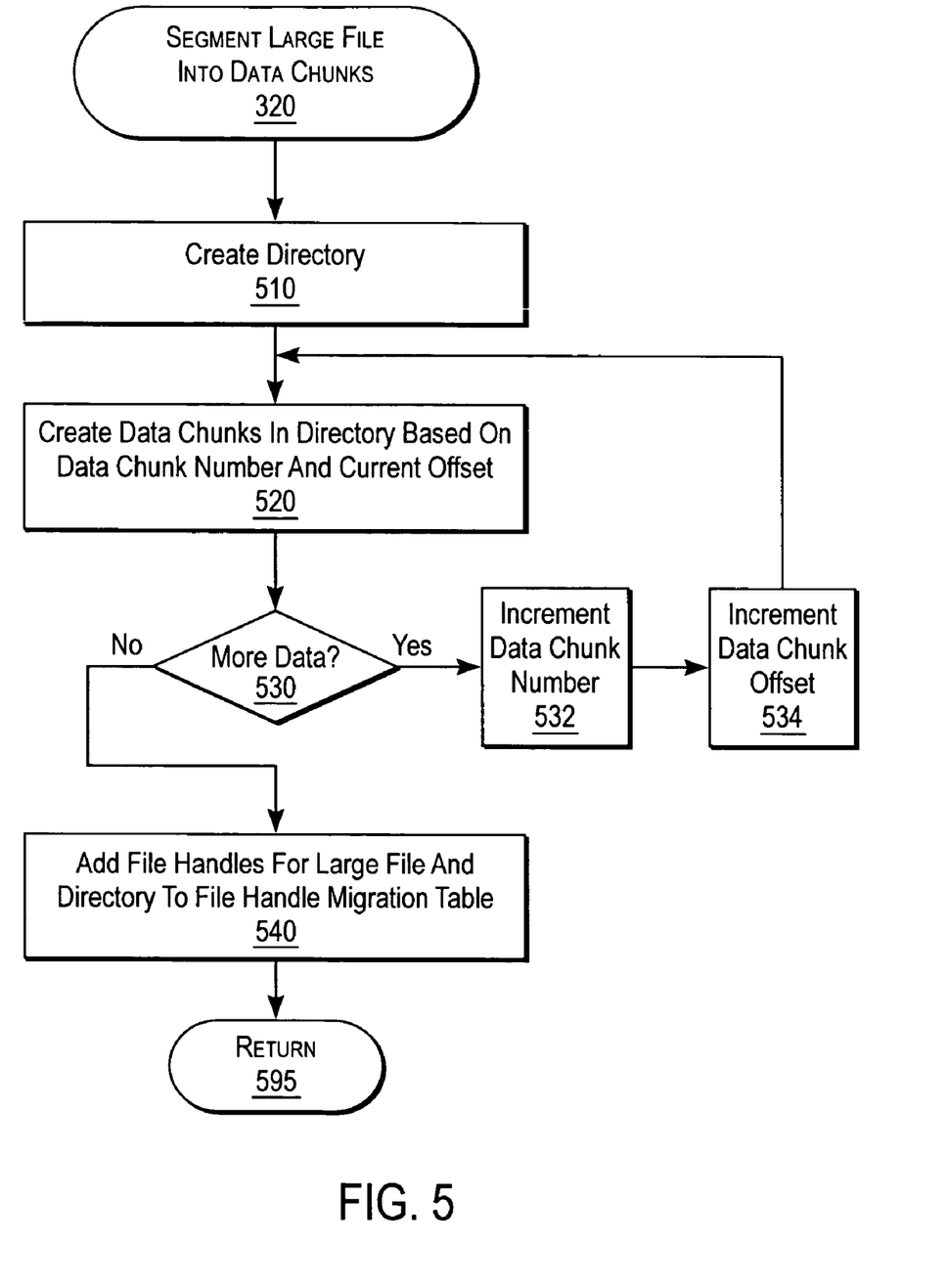
FIG. 5 is a flow chart illustrating a method of segmenting large files into data chunks according to one embodiment of the present invention.

FIG. 5 is a flow chart illustrating the method of segmenting 320 large files into data chunks according to one embodiment of the present invention. The segmentation module 220 creates 510 a directory for storing data chunks of a large file. In one embodiment, the segmentation module 220 creates a general large file directory and creates sub-directories for each large file. Preferably, the sub-directory has a name derived from the large file so that the reconstruction module 230 can use a set algorithm to determine file the sub-directory name. For example, if there is large file named '/home/me/foo.mpg', the corresponding sub-directory can be named '/Large/home/me/foo/mpg'.

The segmentation module 220 creates 520 data chunks in the directory based on a chunk number and a file offset. Preferably, the data chunks have a common preset size such as 1-GB. According to the 1-GB example, the first data chunk contains the data at an offset 0, the second data chunk contains the data starting at an offset of 1-GB, the third data chunk contains the data starting at an offset of 2-GB, and so on. In one embodiment, the data chunk number determines a data chunk name. Thus, the file name for the first data chunk is 0, the name for the second data chunk is 1, the name for the third data chunk is 2, and so on. Of course, there can be variations of the data chunk naming convention. After creating a first file, if there is more data 530, the segmentation module 220 increments the data chunk number 532, increments the data chunk offset 534, and continues creating 520 data chunks until all the data has been stored 530.

In one embodiment, a data chunk can be missing. The segmentation module 220 recognizes missing data chunks as holey files. A holey file comprises holes, or a range of consecutive values. When the segmentation module 220 identifies a missing data chunk, it substitutes the corresponding range with zeroes to fill the hole during output.

In the embodiment of FIG. 5, the segmentation module adds 540 an entry to a file handle migration table that correlates a switch file handle referring to the large file to a NAS file handle referring to a stored file handle containing the directory file handle. In a file migration, the NAS switch 110 moves data from a source file server (e.g., the enterprise file server 120) to a destination file server (e.g., the commodity file server 130). Afterwards, the NAS switch 110 stores a file handle (or a stored file handle) in the source file server that refers to the new location on the destination file server.

In one embodiment, the stored file handle is similar to a non-stored file handle. Preferably, the stored file handle is a predetermined size so that the NAS switch 110 can determine whether a file contains a stored file handle merely by inspecting the file's size. An exemplary stored file format is shown in Table 3:

TABLE 3

Exemplary Stored File Handle

| Byte Offset | Length | Name | Description |
| --- | --- | --- | --- |
| 0-3 | 4 | Stored file handle identifier | 0x06072022 |
| 4-7 | 4 | Stored file handle type | =1 for NFS, =2 for CIFS |
| 8-11 | 4 | Size of stored file handle | Hash value from switch file handle |
| 12-15 | 4 | Contents of stored file handle | Size in bytes |
| 12-size of switch file handle | Size of switch file handle | Padding | See above description |
| | Enough bytes to pad to a length of 419 bytes for NFS and 431 bytes for CIFS | | =0x0 byte |

Note, however, that there can be variations of the stored file format.

Figure 6:
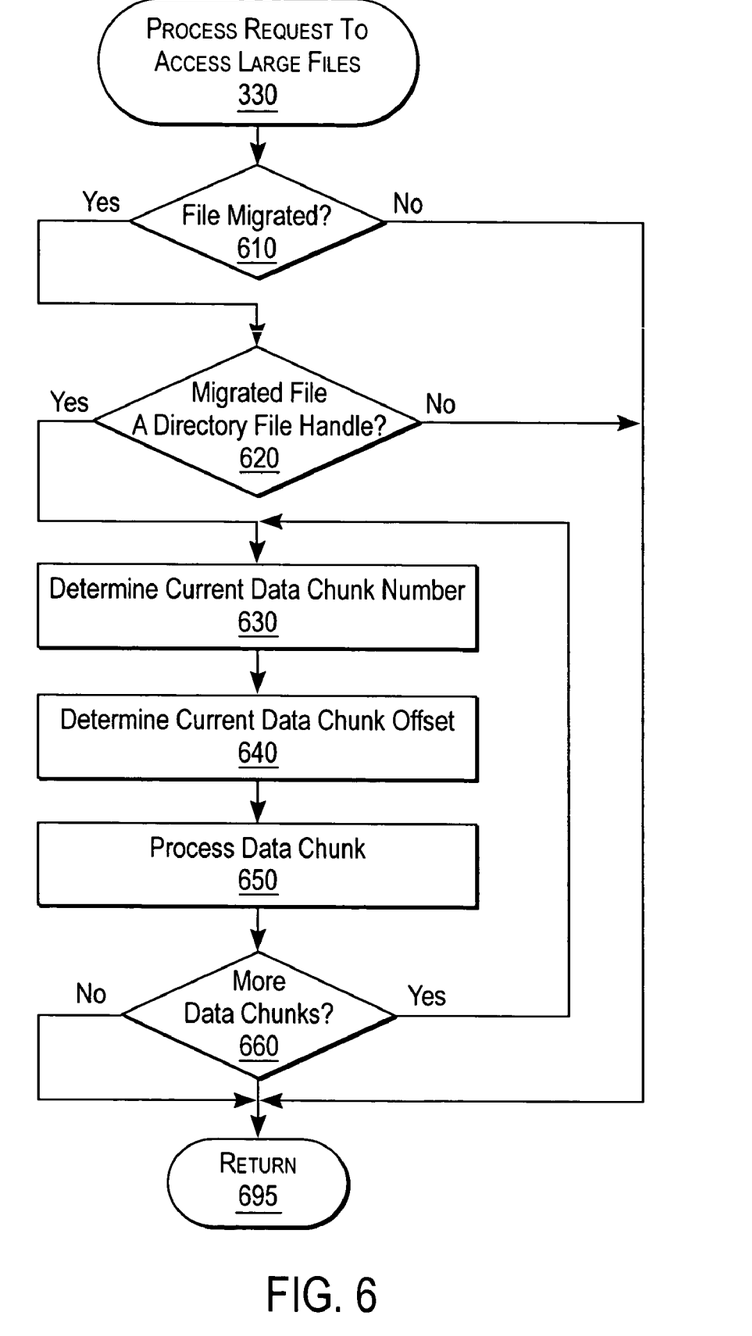
FIG. 6 is a flow chart illustrating a method of processing requests to access large files according to one embodiment of the present invention.

FIG. 6 is a flow chart illustrating a method 330 of processing requests to access large files according to one embodiment of the present invention. The NAS switch 110 receives the NAS request containing the switch file handle from the client 140. The file server interface 210 forwards the switch file handle to the reconstruction module 230 before forwarding to the appropriate location on the commodity file server 130. The reconstruction module 230, in this embodiment, determines whether the client request concerns a large file by determining whether the switch file handle refers to a migrated file 610. To do so, the reconstruction module 230 looks-up the switch file handle in the file handle migration table. If there is no matching entry, the client request does not refer to a large file.

If a matching entry is found, the reconstruction module 230 next determines whether the destination file handle refers to a directory file handle 620. Since stored file handles preferably have a common file size, the reconstruction module 230 can quickly make this determination. If the destination file handle is not a stored file handle, the client request does not concern a large file.

If the request concerns a large file, the reconstruction module 230 determines 630 the data chunk number to process. Generally, the reconstruction module 230 determines 630 the chunk number by dividing a file offset into a data chunk size. The reconstruction module 230 determines 640 a chunk offset by subtracting a product of the data chunk number and the preset size of a data chunk from the file offset. The reconstruction module 230 processes 650 the data chunk with requests such as read, write, and the like. The process continues through each data chunk 660.

For example, to read a large file, the reconstruction module 230 receives the switch file handle, an input offset indicating where to start a read operation, and an input number of bytes to read. The reconstruction module 230 sets a number of bytes read to zero, a number of remaining bytes to be read as the input number of bytes to be read, and sets the offset to the input offset. From this information, the reconstruction module 230 computes the data chunk number, the data chunk offset, and the size of data in the current data chunk (if different from present data chunk value). As discussed, the chunk number is the input offset divided by the preset size of the data chunk. The chunk offset is the product of chunk number and the preset size of the data chunk subtracted from the input offset. Some data chunks, such as the last data chunk, may be smaller than the preset data chunk size. If the remaining bytes to be read is less than or equal to the preset chunk size, the chunk size is set to the remaining bytes to be read. In one embodiment, the chunk sizes are kept consistent by padding the end of a data chunk that is not full with data. The reconstruction module 230 continues the read process by incrementing the number of bytes read by the data chunk size, decrements the remaining bytes to be read by the data chunk size, increments the current chunk by 1, and increments the file offset by the data chunk size. The process of writing a file is similar.

To delete a large file, the reconstruction module 230 removes the destination file handle, the data chunks, the directory, and the file handle migration table entry.

To move a large file, the reconstruction module 230 can update the directory file handle.

To truncate a large file, the reconstruction module 230 computes a data chunk number and a data chunk length. The reconstruction module 230 sets the data chunk number to a new length divided by the preset size of data chunks. The chunk length is the product of the data chunk number and the preset data chunk size subtracted from the new data chunk length. The reconstruction module 230 creates a new file to store the data chunk if the data chunk number does not exist. The data chunk file length is the preset data chunk size or smaller if the last data chunk.

To set a new large file size, the reconstruction module 230 calculates a number of necessary data chunks. If the last data chunk number is smaller than the calculation, the reconstruction module 230 creates the necessary data chunks in the directory.

To determine a large file size attribute, the reconstruction module 230 identifies the last data chunk and multiplies a number of the last data chunk with the preset data chunk size. If the last data chunk is smaller than the preset size, the last data chunk size is substituted in the total.

Other data operations not herein described will be apparent give the above disclosure.

We claim:

1. A method comprising:
receiving at a network device a request from a client to store a large file;
determining the large file has a file size larger than a native processing capability of a network attached storage (NAS) file server;
after determining the large file has the file size larger than the native processing capability of the NAS file server, segmenting the large file into a plurality of data chunks, each of the plurality of data chunks having a chunk size that is smaller than or equal to the native processing capability of the NAS file server;
storing the plurality of data chunks in a directory on the NAS file server;
storing a directory file handle, the directory file handle referring to a location of the directory on the NAS file server, on the network device;
providing a switch file handle to the client, which is mapped to the directory file handle;
receiving at the network device a client request that includes the switch file handle;
at the network device, accessing the plurality of data chunks of the large file from the directory on the NAS file server based on the mapping between the received switch file handle and the directory file handle;
determining whether the received client request is requesting access to the large file; and
adding an entry to a file handle migration table that correlates the switch file handle that is provided to the client with the directory file handle, wherein the directory file handle is further associated with a predetermined size,
wherein the determining whether the received client request is requesting access to the large file comprises:
identifying the switch file handle of the received client request in the file handle migration table to determine whether the switch file handle correlates with the directory file handle and the predetermined size, and
based on identifying the switch file handle of the received client request in the file handle migration table, determining the received client request is requesting access to the large file.

2. The method of claim 1, wherein the storing the plurality of data chunks further comprises:
naming the directory in which the plurality of data chunks are stored on the NAS file server based on a name of the large file; and
naming the plurality of data chunks based on the name of the large file.

3. The method of claim 2, wherein the naming the plurality of data chunks comprises:
determining a number of the plurality of data chunks by dividing the large file size by a preset data chunk size; and
for each of the plurality of data chunks, appending a data chunk number to a directory name, the directory name corresponding to the directory in which the plurality of data chunks are stored on the NAS file server.

4. The method of claim 1, wherein the accessing the plurality of data chunks further comprises:
determining a name of the directory from a name of the large file; and
determining a name for each of the plurality of data chunks from the name of the large file.

5. The method of claim 4, wherein determining the name for each of the plurality of data chunks comprises:
  for each of the plurality of data chunks, determining a data chunk number by dividing a file offset for the data chunk by a preset data chunk size; and
  appending the data chunk number for the data chunk to the directory name for the data chunk.

6. The method of claim 1, further comprising:
  adding an entry to a large file table, wherein the determining whether the received client request is requesting access to the large file includes identifying a file handle corresponding to the received client request in the large file table.

7. The method of claim 1, wherein the received client request specifies to read the large file, write to the large file, or truncate the large file.

8. The method of claim 1, wherein the NAS file server's native capability comprises a 32-bit addressing capability, and wherein the large file size is greater than approximately 2-GB.

9. The method of claim 1, wherein the NAS file server's native capability comprises a NAS protocol which supports a file size of up to approximately 2-GB, and wherein the large file size is greater than approximately 2-GB.

10. A Network Attached Storage (NAS) switch system comprising:
  one or more processors; and
  one or more memory, wherein at least one of the one or more processors and memory are configured to perform the following operations:
  receiving at a network device a request from a client to store a large file;
  determining that the large file has a file size larger than a native processing capability of a NAS file server;
  after determining the large file has the file size larger than the native processing capability of the NAS file server, segmenting the large file into a plurality of data chunks, each of the plurality of data chunks having a chunk size that is smaller than or equal to the native processing capability of the NAS file server;
  storing the plurality of data chunks in a directory on the NAS file server;
  storing a directory file handle, the directory file handle referring to a location of the directory on the NAS file server, on the network device;
  providing a switch file handle to the client, which is mapped to the directory file handle;
  receiving at the network device a client request that includes the switch file handle;
  at the network device, accessing the plurality of data chunks of the large file from the directory on the NAS file server based on the mapping between the received switch file handle and the directory file handle;
  determining whether the received client request is requesting access to the large file; and
  adding an entry to a file handle migration table that correlates the switch file handle that is provided to the client with the directory file handle, wherein the directory file handle is further associated with predetermined size, and wherein determining whether the received client request is requesting access to the large file is accomplished by:
    identifying the switch file handle of the received client request in the file handle migration table to determine whether the switch file handle correlates with the directory file handle and the predetermined size, and based on identifying the switch file handle of the received client request in the file handle migration table, determining the received client request is requesting access to the large file.

11. The NAS switch system of claim 10, wherein the storing the large file is accomplished by:
  naming the directory in which the plurality of data chunks are stored on the NAS file server with a directory name based on a name of the large file, and
  naming the plurality of data chunks based on the name of the large file.

12. The NAS switch system of claim 11, wherein the naming the plurality of data chunks is accomplished by:
  determining a number of data chunks by dividing the large file size by a data chunk size, and
  for each of the plurality of data chunks, appending a data chunk number to the directory name for the directory in which the plurality of data chunks are stored.

13. The NAS switch system of claim 10, wherein accessing the plurality of data chunks is accomplished by determining a name of the directory based on a name of the large file, and determining a name for each of the plurality of data chunks based on the name of the large file.

14. The NAS switch system of claim 13, wherein the at least one of the one or more processors and memory are further configured for:
  for each data chunk, determining a data chunk number for the data chunk, by dividing a file offset by a preset data chunk size, and
  for each data chunk, appending the data chunk number for the data chunk to the directory name such for each data chunk.

15. The NAS switch system of claim 10, wherein the at least one of the one or more processors and memory are further configured for determining whether the received client request is requesting access to the large file.

16. The NAS switch system of claim 10, wherein the received client request specifies to read the large file, write to the large file, or truncate the large file.

17. The NAS switch system of claim 10, wherein the NAS file server comprises a 32-bit capable file server, and wherein the large file size is greater than approximately 2-GB.

18. The NAS switch system of claim 10, wherein the file server has a NAS protocol which supports a file size of up to approximately 2-GB, and wherein the large file size is greater than approximately 2-GB.

19. A computer program product, comprising:
  a computer-readable storage medium having computer program instructions and data embodied thereon comprising:
  receiving at a network device a request from a client to store a large file;
  determining that the large file has a file size larger than a native processing capability of a network attached storage (NAS) file server;
  after determining that the large file has the file size larger than the native processing capability of the NAS file server, segmenting the large file into a plurality of data chunks, each of the plurality of data chunks having a chunk size that is smaller than or equal to the native processing capability of the NAS file server;
  storing the plurality of data chunks in a directory on the NAS file server;
  storing a directory file handle, the directory file handle referring to a location of the directory on the NAS file server, on the network device;

providing a switch file handle to the client, the switch file handle being mapped to the directory file handle;
receiving at the network device a client request that includes the switch file handle;
at the network device, accessing the plurality of data chunks of the large file from the directory on the NAS file server based on the mapping between the received switch file handle and the directory file handle;
determining whether the received client request is requesting access to the large file; and
adding an entry to a file handle migration table that correlates the switch file handle that is provided to the client with the directory file handle, wherein the directory file handle is further associated with predetermined size, and wherein determining whether the received client request is requesting access to the large file is accomplished by:
identifying the switch file handle of the received client request in the file handle migration table to determine whether the switch file handle correlates with the directory file handle and the predetermined size, and
based on identifying the switch file handle of the received client request in the file handle migration table, determining the received client request is requesting access to the large file.

20. The computer program product of claim 10, wherein the storing the plurality of data chunks further comprises:
naming the directory in which the plurality of data chunks are stored on the NAS file server based on a name of the large file; and
naming the plurality of data chunks based on the name of the large file.

21. The computer program product of claim 19, wherein the accessing the plurality of data chunks further comprises:
determining a name of the directory from a name of the large file; and
determining a name of the plurality of data chunks from the name of the large file.

22. The computer program product of claim 19, further comprising program code for determining whether the received client request is requesting access to the large file.

23. The computer program product of claim 19, wherein the NAS file server's native capability comprises a 32-bit addressing capability, and wherein the large file size is greater than approximately 2-GB.

24. The computer program product of claim 19, wherein the NAS file server's native capability comprises a NAS protocol which supports a file size of up to approximately 2-GB, and wherein the large file size is greater than approximately 2-GB.

25. A Network Attached Storage (NAS) system comprising:
means for receiving at a network device a client request to store a large file;
means for determining the large file has a file size larger than a native processing capability of a NAS file server;
means for segmenting the large file into a plurality of data chunks, each of the plurality of data chunks having a chunk size that is smaller than or equal to the native processing capability of the NAS file server, after determining the large file has the file size larger than the native processing capability of the NAS file server;
means for storing the plurality of data chunks in a directory on the NAS file server;
means for storing a directory file handle, the directory file handle referring to a location of the directory on the NAS file server, on the network device;
means for providing a switch file handle to the client, the switch file handle being mapped to the directory file handle;
means for receiving at the network device a client request that includes the switch file handle; and
means for accessing the plurality of data chunks of the large file from the directory on the NAS file server based on the mapping between the received switch file handle and the directory file handle at the network device;
means for determining whether the received client request is requesting access to the large file; and
means for adding an entry to a file handle migration table that correlates the switch file handle that is provided to the client with the directory file handle, wherein the directory file handle is further associated with predetermined size, and wherein determining whether the received client request is requesting access to the large file is accomplished by:
identifying the switch file handle of the received client request in the file handle migration table to determine whether the switch file handle correlates with the directory file handle and the predetermined size, and
based on identifying the switch file handle of the received client request in the file handle migration table, determining the received client request is requesting access to the large file.

\* \* \* \* \*